Patented Aug. 17, 1926.

1,596,119

UNITED STATES PATENT OFFICE.

ROBERT W. POINDEXTER, JR., OF LOS ANGELES, CALIFORNIA, ASSIGNOR TO CALIFORNIA CYANIDE COMPANY, INCORPORATED, OF NEW YORK, N. Y., A CORPORATION OF DELAWARE.

PROCESS FOR MAKING CALCIUM CYANOGEN COMPOUNDS AND THE PRODUCT THEREOF.

No Drawing.   Application filed February 18, 1926. Serial No. 89,224.

This invention relates to an improved method of producing solid cyanogen compounds of the alkaline earth metals and to the product thereof.

As is well known, the cyanides of metals forming strongly basic hydroxides such, for example, as sodium and potassium, may be produced readily by causing such hydroxides to react with hydrocyanic acid in aqueous solution, and then evaporating the solutions to obtain the corresponding cyanides in solid form. Even in the case of the cyanides of such strong bases, the solutions obtained by the reaction are evaporated preferably in a vacuum because the cyanide compounds tend to decompose when the solutions are evaporated at atmospheric pressure. In such solutions, the decomposition consists principally in the hydrolysis of the cyanide to ammonia and the formate of the corresponding metal. Aqueous solutions of the cyanides of the alkaline earth metals of which the hydroxides are weaker bases than the hydroxides of sodium and potassium, may be produced by reacting on the corresponding hydroxides in aqueous solution. When, however, evaporation of such solutions is attempted, even under a high vacuum, the cyanides usually decompose into free hydrocyanic acid and the hydroxide of the corresponding metal. For example, in the case of calcium, water enters into this reaction as shown by the equation:

$$Ca(CN)_2 + 2H_2O \rightarrow Ca(OH)_2 + 2HCN.$$

Thus, a dilute solution of calcium cyanide may be prepared readily by treating an aqueous suspension of calcium hydroxide with hydrocyanic acid. The calcium hydroxide goes into solution as calcium cyanide.

$$Ca(OH)_2 + 2HCN \rightarrow Ca(CN)_2 + H_2O$$

but, on evaporating such a solution, the hydrocyanic acid distills off, leaving a suspension of calcium hydroxide in water, even when the evaporation is conducted under a vacuum. This fact is already well known and described in the literature, as for instance, in "The Chemistry of Cyanogen Compounds" by Herbert E. Williams, page 42.

It is the object of the present invention to provide new cyanogen products and a method of preparing the solid cyanides of the weakly basic metals.

I am aware that a method of producing a calcium cyanide which consists in treating calcium carbide with hydrocyanic acid has been discovered by Floyd J. Metzger. The calcium cyanide product which results from carrying out my process is similar in many ways to that prepared by the Metzger process from calcium carbide. It is differentiated from the latter in that it contains a variable amount of alcohol of combination. The process which I have discovered, however, is entirely distinct from that of Metzger in that it starts with entirely different calcium compounds, namely, calcium oxide or calcium hydroxide in place of the calcium carbide used by Metzger, thus substituting cheap and easily obtainable raw materials for the more expensive calcium carbide.

The fact that my cyanide product contains alcohol of combination does not prevent its being employed for those uses to which calcium cyanide is usually applied. In particular, my product possesses the property, which will later be described in detail, of evolving hydrocyanic acid freely and copiously when exposed to the atmosphere. This property makes it extremely valuable for the purpose of fumigation, for the control of all sorts of insect and animal pests. Since it is stable so long as it is excluded from contact with the atmosphere, it may be stored and transported readily and safely. When applied to plants in thin layers or by dusting into the atmosphere, or when similarly applied in enclosed spaces which it is desired to fumigate, the product of the process which I have discovered rapidly evolves nearly its entire cyanogen content in the form of hydrocyanic acid. The great value of calcium cyanide produced by my process for the most varied kinds of fumigation is thus apparent, as is also its superiority over liquid hydrocyanic acid for similar purposes on account of the well known hazard in storing and transporting the latter.

When either calcium oxide or calcium hydroxide is suspended in a substantially anhydrous alcohol, such as methyl or ethyl alcohol, and substantially anhydrous hydrocyanic acid is added to such a suspension, the calcium hydroxide almost immediately dissolves, yielding a clear solution of calcium cyanide.

$$CaO + 2HCN \rightarrow Ca(CN)_2 + H_2O.$$

If evaporation of such a solution is attempted, even under a vacuum, the solution darkens rapidly, becoming dark brown or nearly black. As the evaporation is continued, a residue is obtained, consisting of a nearly black gelatinous mass. The dark material thus prepared contains but little cyanogen, in all cases less than that corresponding to the formula $Ca(CN)_2$, having lost most of its original cyanogen content either through liberation as free hydrocyanic acid, or through such liberation followed by polymerization of the hydrocyanic acid.

I have discovered that excellent products may be obtained, nevertheless, by treating such alcoholic solutions of calcium cyanide with an excess of hydrocyanic acid. Calcium cyanide is less soluble in hydrocyanic acid than in methyl or ethyl alcohol and consequently the addition of excess hydrocyanic acid causes a precipitation of calcium cyanide. The precipitate may readily be dried, since the mixture of alcohol and hydrocyanic acid adhering to it is quite volatile.

In all cases I have found it possible to use calcium hydroxide in place of calcium oxide in carrying out my process. Pure calcium compounds may be used but the process can be carried out with the commercial grades of calcium oxide and calcium hydroxide. The following equations illustrate the reactions involved by the use of these two materials:

$$CaO + 2HCN \rightarrow Ca(CN)_2 + H_2O.$$
$$Ca(OH)_2 + 2HCN \rightarrow Ca(CN)_2 + 2H_2O.$$

It is thus apparent that in case calcium hydroxide is used, twice as much water will be formed. This will produce a slightly greater dilution of the reaction mixture, but this does not very materially affect the production of the desired calcium cyanogen compound in carrying out my process. The term "oxide" as used in the claims hereinafter includes the hydrated oxide or hydroxide.

The product will normally contain the impurities such as silicia, iron, alumina, silicates, etc., which are present in the calcium oxide or hydroxide. These impurities are insoluble, however, in the alcohol solution and can be removed by filtering before the excess of hydrocyanic acid is introduced to precipitate the calcium cyanide. It is possible, therefore, to produce calcium cyanide substantially free from impurities by following the procedure indicated.

If a product of good color and purity is wanted, it is desirable, though not essential, to wash the precipitate, before drying, with hydrocyanic acid, for the purpose of removing alcohol adhering to it. The product prepared as described is a light, fluffy crystalline powder. In color it may be white, cream color, buff or light brown, depending on the conditions used in its preparation. I believe the color of those batches which are not white to be due to the presence of polymerized hydrocyanic acid. If the process has been carefully carried out, and in particular if it has been conducted rapidly, the product, after drying, will be white.

All batches of the product which I have thus far prepared contain, in addition to calcium cyanide, more or less of the particular alcohol used in the process. The amount of alcohol present has been found to vary with the conditions used in this preparation. The calcium product has, therefore, the approximate formula $$Ca(CN)_2.xR(OH),$$

R being the radical of the alcohol used in preparing the product. The invention comprehends the substitution of other metals of the alkaline earth group, including barium and strontium, for the calcium, forming compounds of the general formula $$M(CN)_x.xR(OH)$$

where M indicates the metal. The presence of alcohol, even after thorough drying in products prepared in this general manner, may be shown by dissolving the dry material in a solution of sodium hydroxide. The sodium hydroxide reacts with the calcium cyanide to produce calcium hydroxide and sodium cyanide. On distilling the resultant mixture, alcohol may be identified in the distillate.

The chemical composition of the product is subject to a slight variation. This variation in composition appears to depend on the conditions prevailing during its manufacture. This, however, does not affect its usefulness for the purposes for which calcium cyanide is or may be employed, since the variation is only slight. The following table indicates the results of variation in composition which may be expected.

| Run No. | Per cent Ca. | Per cent CN. | Per cent methyl alcohol (by difference). |
|---|---|---|---|
| 1 | 26.9 | 40.9 | 32.2 |
| 2 | 26.3 | 43.2 | 30.5 |
| 3 | 27.6 | 45.2 | 27.2 |
| 4 | 27.6 | 43.5 | 28.9 |
| 5 | 27.9 | 44.6 | 27.5 |
| 6 | 26.8 | 42.7 | 30.5 |
| 7 | 27.5 | 49.4 | 23.1 |
| 8 | 28.2 | 44.6 | 27.2 |
| 9 | 27.2 | 42.3 | 30.5 |
| 10 | 27.3 | 49.4 | 23.3 |
| 11 | 26.8 | 40.0 | 33.2 |

The product is stable when not exposed to the atmosphere, but when exposed to the atmosphere it evolves hydrocyanic acid and alcohol. The evolution of these substances, on exposure to the atmosphere, is so rapid that the evolved vapors may be ignited, when they will burn with a flame. When exposed to the atmosphere in thin layers, nearly all of the cyanogen content of the material is evolved in the form of hydrocyanic acid, leaving a residue consisting essentially of calcium hydroxide. If the residue is exposed to the air for a sufficiently long period, it will eventually become converted to calcium carbonate by absorption of carbon dioxide from the atmosphere as would be expected from any specimen of calcium hydroxide so exposed. The calcium cyanide product which I have discovered is readily soluble in water, in methyl alcohol, or in ethyl alcohol. The solutions thus produced show the usual reactions for calcium and cyanogen ions. The color of such solutions, when first prepared, corresponds to the color of the dry material used in their preparation, but when allowed to stand such solutions tend to darken in color on account of the formation of hydrocyanic acid polymer.

To more clearly indicate the preferred method of producing calcium cyanide by the process which I have discovered, I give the following specific example:

Six grams of high grade, commercial, powdered calcium oxide was placed in a beaker and 40 c. c. of substantially pure, absolute methyl alcohol added. This mixture was stirred vigorously, so as to keep the calcium oxide in suspension, while 10 c. c. of substantially anhydrous liquid hydrocyanic acid was added. The reaction between the hydrocyanic acid and the suspended calcium oxide was almost instantaneous and was accompanied with considerable ebullition, due to evolution of heat. The calcium oxide dissolved quite completely, resulting in a nearly colorless solution. 70 c. c. of anhydrous liquid hydrocyanic acid were then added to the solution, resulting in a copious white precipitate. The mixture was filtered through filter paper supported on a Hirsch vacuum funnel, with the use of suction by vacuum to hasten filtration. The precipitate was washed with 30 c. c. of anhydrous liquid hydrocyanic acid. The suction was continued about one minute, in order to remove as much excess hydrocyanic acid as possible. The precipitate was then quickly transferred to a 150 c. c. Erlenmeyer flask. The flask was placed in a large beaker of water, heated to 30° C. and a vacuum maintained at 26" was applied to it for a period of one hour. The dried product was white in color and was in a very fine state of subdivision. Analysis showed:

Calcium (Ca) 28.2%, cyanogen (CN) 44.6%. The difference between the sum of these percentages, (27.2%) was assumed to consist chiefly of methyl alcohol, but the alcohol content was not determined by analysis. Ethyl alcohol may be substituted for methyl alcohol in the process without in any way affecting it. It will affect the product to the extent that the latter will contain ethyl alcohol of combination in place of methyl alcohol of combination. This change is entirely immaterial for any of the uses to which calcium cyanide is usually put. Similarly other alcohols may be used in place of either ethyl or methyl alcohol. The former, however, are to be preferred on account of their lower cost.

The operation as described affords a reliable and relatively inexpensive process for producing solid cyanide compounds of the alkaline earth metals, and various changes can be made in the details thereof without departing from the invention or sacrificing the advantages thereof.

I claim:—

1. The process of producing solid cyanides of the alkaline earth metals, which consists in treating a mixture of the oxide of the metal and a monohydric alcohol with an excess of hydrocyanic acid.

2. The process of producing solid cyanides of calcium, which consists in treating a mixture of calcium oxide and a monohydric alcohol with an excess of hydrocyanic acid.

3. The process of producing a solid cyanogen compound of an alkaline earth metal, which consists in forming an alcoholic solution of the cyanide of the metal by treating a mixture of the oxide of the metal and a monohydric alcohol with hydrocyanic acid and then adding an excess of hydrocyanic acid to precipitate the cyanogen compound.

4. The process of producing a solid calcium cyanogen compound, which consists in forming an alcoholic solution of calcium cyanide by means of treating a mixture of calcium oxide and a monohydric alcohol with hydrocyanic acid and then adding an excess of hydrocyanic acid to precipitate the calcium cyanogen compound.

5. The process of producing a solid cyanogen compound of an alkaline earth metal, which consists in forming an alcoholic solution of the cyanide of the metal by treating a mixture of the oxide of the metal and a monohydric alcohol with hydrocyanic acid, adding an excess of hydrocyanic acid to precipitate the cyanogen compound and washing the precipitate with hydrocyanic acid.

6. The process of producing a solid calcium cyanogen compound, which consists in forming an alcoholic solution of calcium cyanide by means of treating a mixture of calcium oxide and a monohydric alcohol with hydrocyanic acid, adding an excess of hydrocyanic acid to precipitate the cyanogen compound and washing the precipitate with hydrocyanic acid.

7. The process of producing a solid cyanogen compound of an alkaline earth metal, which consists in forming an alcoholic solution of the cyanide of the metal by treating a mixture of the oxide of the metal and a monohydric alcohol with hydrocyanic acid, adding an excess of hydrocyanic acid to precipitate the cyanogen compound, washing the precipitate with hydrocyanic acid and drying the precipitate.

8. The process of producing a solid calcium cyanogen compound, which consists in forming an alcoholic solution of calcium cyanide by treating a mixture of calcium oxide and a monohydric alcohol with hydrocyanic acid, adding an excess of hydrocyanic acid to precipitate the cyanogen compound, washing the precipitate with hydrocyanic acid and drying the precipitate.

9. A solid cyanogen product containing a metal of the alkaline earth group and having the formula $$M(CN)_x \cdot xR(OH).$$

10. A solid calcium cyanogen product having the formula $$Ca(CN)_2 \cdot xR(OH).$$

11. A solid cyanogen product comprising a cyanide of a metal of the alkaline earth group with monohydric alcohol of combination.

12. A solid calcium cyanogen product comprising calcium cyanide with monohydric alcohol of combination.

13. A solid cyanogen product capable of decomposing upon exposure to an atmosphere to release hydrocyanic acid and a monohydric alcohol.

In testimony whereof I affix my signature.

ROBERT W. POINDEXTER, Jr.